Dec. 25, 1934.  M. J. MULLIN  1,985,738
SEWAGE DISPOSAL PLANT
Filed Oct. 3, 1930   2 Sheets-Sheet 1
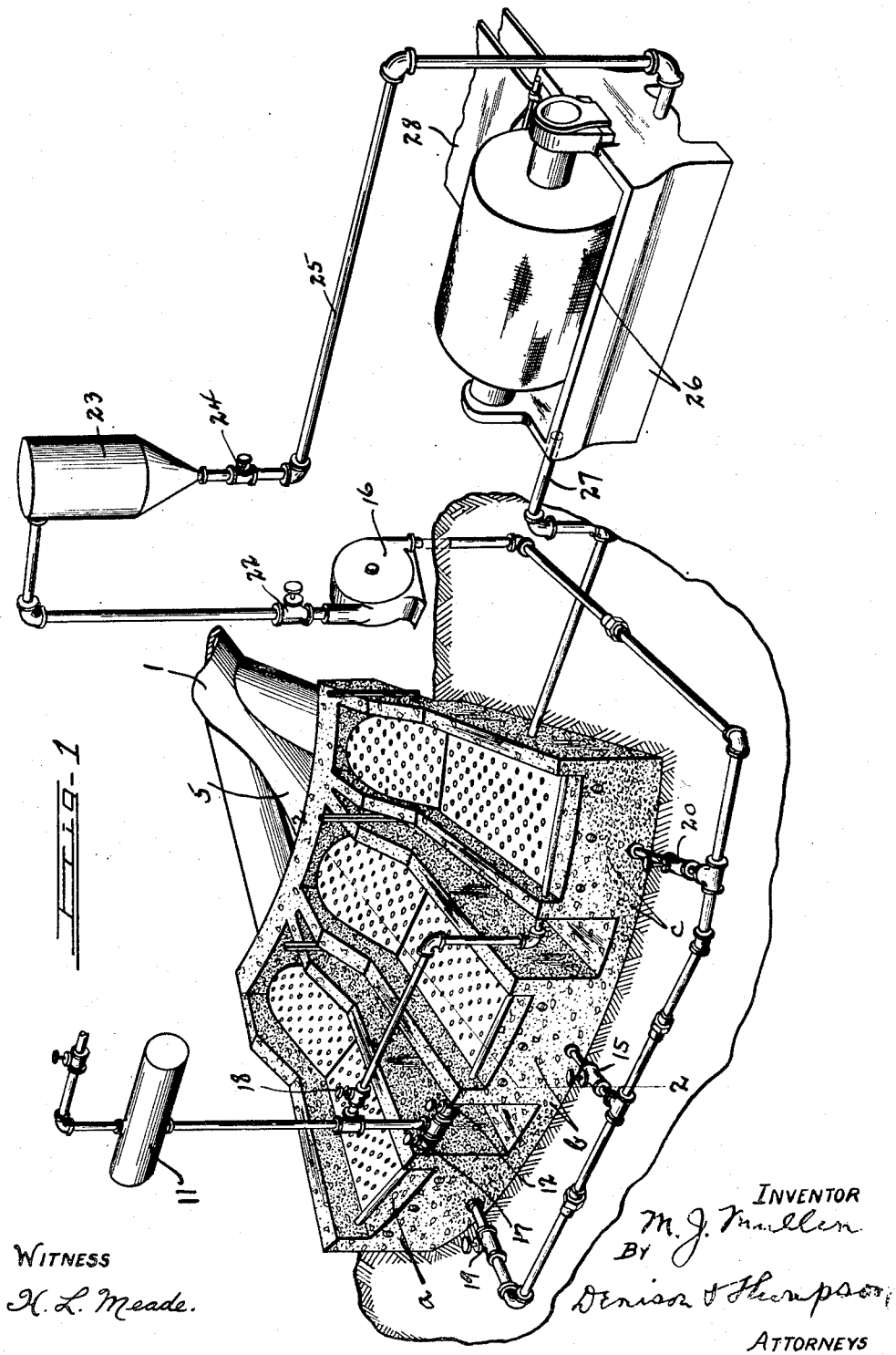

Dec. 25, 1934. M. J. MULLIN 1,985,738
SEWAGE DISPOSAL PLANT
Filed Oct. 3, 1930 2 Sheets-Sheet 2
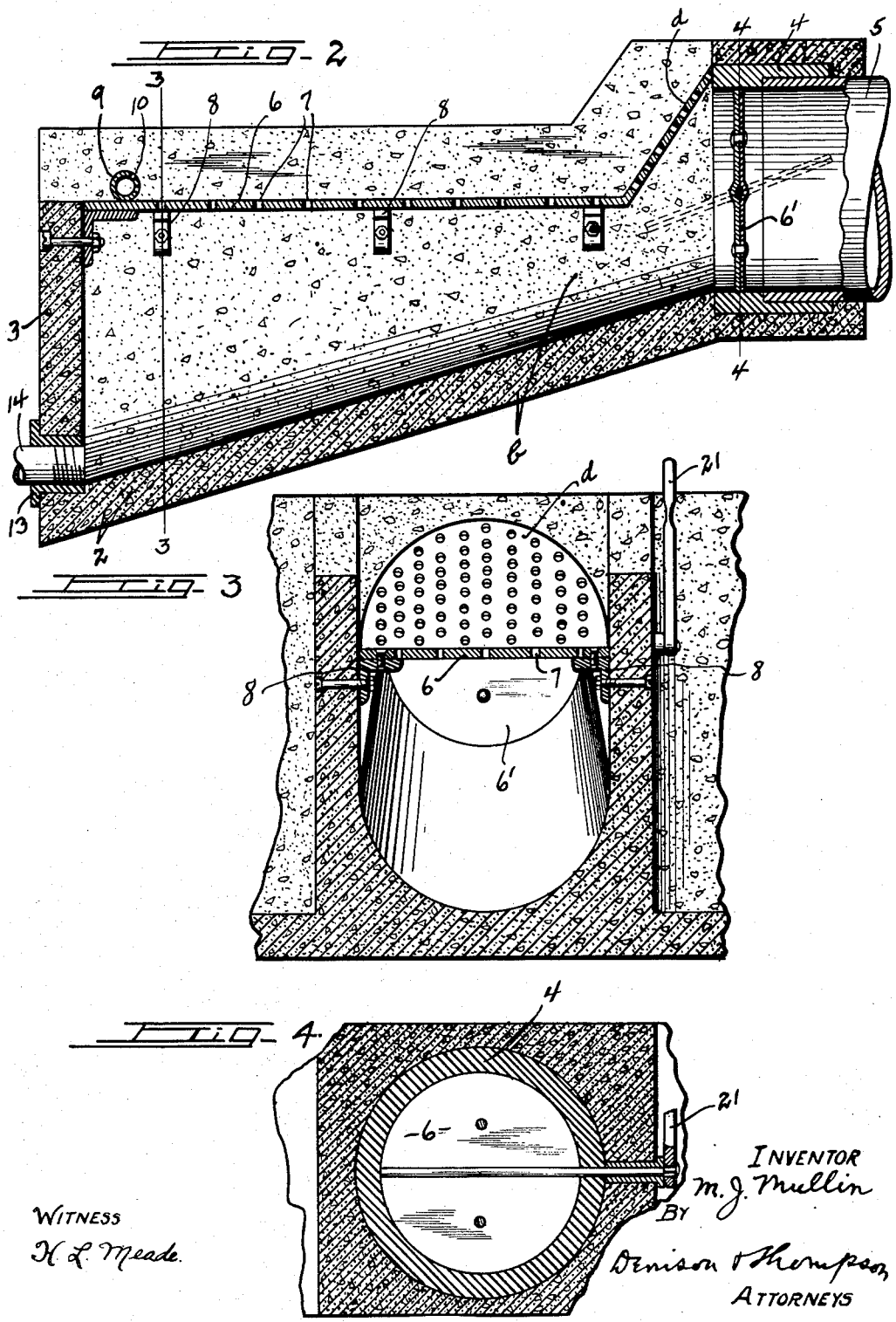

Patented Dec. 25, 1934

1,985,738

UNITED STATES PATENT OFFICE 1,985,738

SEWAGE DISPOSAL PLANT

Michael J. Mullin, Solvay, N. Y.

Application October 3, 1930, Serial No. 486,140

11 Claims. (Cl. 210—2)

This invention relates to a new and improved sewage disposal system.

The problem of successfully disposing of the sewage from communities and particularly large cities is one which has heretofore not been successfully solved by any sewage disposal system known.

The problem is not only to purify and dispose of the sewage so that there will be no deleterious effects from its deposit in streams or lakes or other areas, but it is also an economic one in that the solid matter in such sewage should be and may be reclaimed and transformed into fertilizer or other by-products.

Several systems have been evolved to accomplish the ends sought but none of them have proved to be a success either for the disposition of sewage or for the reclamation of the solid matter in such sewage.

Systems have been erected in which the sludge was activated in a receptacle having a false bottom made of tile of such a composition that it is impervious to liquid, but will permit the passage therethrough of air under pressure. In working a system of this character, compressed air is introduced beneath the false tile bottom and this air passing through the tile and into the sludge will force a considerable part of the solid matter to the top of the tank from which it may be skimmed and saved.

This type of system is expensive to operate, ineffective in results and, from the commercial point of view and the sanitary point of view, impractical.

Other systems have been made in which the sludge is passed through a series of septic tanks and eventually purified to a considerable extent. Such an installation is expensive to build, is not entirely effective as to the purification of the sewage, and the amount of solid matter which may be reclaimed is negligible.

Other systems have been used in which the activated sludge is spread over a large acreage of land and allowed to dry in the sun, the dried solid matter being afterwards scraped up and reclaimed. These systems are impractical in that they require a very large acreage and a very considerable length of time before the sludge is thoroughly dried. They are therefore entirely impractical when a large amount of sewage must be taken care of.

Other systems have been built in which the sewage is passed through pipes in which are positioned screens in spaced relation so that the solid matter in the sludge will be broken up as it passes through the screens and will eventually be in suspension in the liquid at which time it is then allowed to escape.

These systems are impractical in that they require very large plants and very large disposal areas with no assurance that the sludge which is finally allowed to escape is purified and in addition no provision is made for reclaiming any of the solid matter in the sludge.

The main object of my invention is to provide a sewage disposal plant by the use of which practically all of the solid matter in the sludge may be reclaimed and converted into fertilizer or other by-products and the liquid may be purified to a safe degree before it is allowed to escape.

Another object is to provide a sewage disposal plant by the use of which the movement of the sludge through the discharge end of the sewer will itself effectuate separation of the liquid content from the solids.

Another object is to provide a sewage disposal plant which will be economical to install and operate and which will function uninterruptedly and without liability of clogging, which latter is one of the inherent weaknesses of all systems hitherto known to the art.

Other objects and advantages relate to the size, shape and arrangement of parts, all as will more fully appear from the following description taken in connection with the accompanying drawings, in which:—

Figure 1 is a perspective view of the discharge end of my sewage disposal system.

Figure 2 is a section on line 2—2 of Figure 1.

Figure 3 is a section on line 3—3 of Figure 2.

Figure 4 is a section on line 4—4 of Figure 2.

In Figure 1, I have shown a perspective view of an apparatus which is used at the discharge end of a sewage system for carrying out my new and improved system of sewage disposal.

As shown, the discharge end of the main sewer pipe 1 is connected to a plurality, in this case shown as three, of sludge pits a, b and c.

The system may be followed by the use of one or any number of such sludge pits depending upon the amount of sewage which is discharged from the main sewer 1, the advantage of more than one sludge pit being that one may be shut off from the main sewer 1 in order to empty the same while the others are permitted to receive sewage from the pipe 1.

The sludge pits a, b and c are similar in construction and a description of one will be a description of all, and in Figures 2, 3 and 4, I have shown sectional views which illustrate the construction of the sludge pit *b*.

The sludge pit *b* consists of a main tank 2 here shown as octagonal in form and with an inclined bottom. The outer end 3 of the pit *b* and the bottom and side walls thereof are preferably formed of an imperforate material such as cement.

The inner end of the tank 2 is connected by a collar 4 to the end of the sewer pipe 5. In the inner end of the pit *b* is mounted a pivoted gate 6' which is adapted, in one position shown in heavy lines in Figure 2, to cut off communication between pipe 5 and pit *b*.

The upper side of pit *b* is covered with a plate 6 provided with a comparatively large number of perforations 7 which are comparatively small in size, as for example, $\frac{1}{16}$ inch in diameter.

Plate 6' is supported in pit 3 on brackets 8 and is positioned some distance below the upper surfaces of the sides of pit 2 so that the plate 6 is positioned preferably slightly below the center point of the pipe 5. The inner end of plate 6 is bent upwardly as shown at *d* at an angle of approximately 45 degrees so that its upper end will join the upper side of collar 4, thus insuring that any material passing from pipe 5 into pit *b* cannot escape except through plate 6.

At the outer end of plate 6 and positioned transversely thereof is a pipe 9 having a plurality of spaced perforations 10.

Pipe 9 is connected to a tank 11 in which is stored a supply of chlorine, such connection being controlled by a valve 12.

At the forward end of pit *b* and adjacent the bottom thereof is provided a nipple 13 in which is screw-threaded a draw-off pipe 14 controlled by a valve 15. The draw-off pipe 14 leads to a rotary pump 16.

Sludge pits *a* and *c* are similar in construction, the supply of chlorine to sludge pit *a* being controlled by valve 17 and the supply of chlorine to sludge pit *c* being controlled by a valve 18.

The draw-off pipe from sludge pit *a* is controlled by a valve 19 and the draw-off pipe from sludge pit *c* is controlled by a valve 20.

When it is desired to fill a sludge pit *b* with sludge from the pipe 5, the valve 15 is closed and the gate 6' is opened to approximately the position shown in dotted lines in Figure 2 in which gate 6' functions as a baffle for the sludge coming from pipe 5 and directs the same downwardly towards the bottom and forward end of sludge pit *b*.

The sludge coming from pipe 5 will pass into sludge pit *b* under a certain amount of pressure which will cause the solid matter to be forced downwardly and forwardly against the imperforate bottom, side walls and forward end of sludge pit *b* and will cause the liquid in the sludge to be forced forwardly and upwardly against the undersurface of plate 6 and up through the perforations 7 in plate 6.

I have found that under operating conditions, the liquid in sludge pit *b* which carries more or less solid matter in suspension, will be kept under a continuing agitation so that there will be no liability of any of the solid or foreign matter in the sludge to foul or close the apertures 7 in plate 6 with the result that the liquid will be continuously forced upwardly through apertures 7 under a pressure which will cause the same to be thrown above the upper surface of plate 6 and become to some extent aerated.

The liquid which has passed upwardly through the plate 6 will then pass forwardly on the upper surface of plate 6 and over the perforated pipe 9 where it will become saturated to the desired extent with chlorine for the purpose of purification, after which it will pass outwardly to the place of final disposition.

With this arrangement of parts and with the perforated plate 6 only on the upper surface of pit *b* there is no possibility of the solid matter in the sludge closing the apertures 7 in the plate 6 until the sludge pit *b* has become filled with solid matter.

This, of course, would not be true if the bottom, sides or forward end of the sludge pit *b* were provided with perforated plates because as the solid matter built up, it would of necessity cover the apertures in the lower ends of such perforated plates.

When the sludge pit *b* has received solid matter to the limit of its capacity, the gate 6' is moved on its pivot by means of an operating lever 21 to shut off the pipe 5 from the sludge pit *b*, the valve 15 is then opened and the pump 16 set in motion, valve 22 between pump 16 and storage tank 23 having first been opened.

The solid matter in sludge pit *b* will thus be pumped upwardly into storage tank 23.

Although not necessary, I prefer to leave such solid matter in the storage tank 23 for a limited length of time and for that purpose, I provide a cut-off valve 24 at the bottom end of storage tank 23.

For the purpose of removing any residue of moisture which may still be in the sludge which has been pumped from the sludge pit *b*, I open valve 24 and permit the sludge in storage tank 23 to pass downwardly through a pipe 25 to a separator or rotary vacuum filter 26 which may be of any conventional or well known type.

The sludge passing through the filter 26 will have the residue of liquid separated therefrom, which liquid will be returned through pipe 27 to one of the sludge pits, it being shown as connected to sludge pit *c*.

The solid matter which has passed through the filter 26 will be deposited on a conveyor 28 and thence may be carried to whatever apparatus it may be desired to use to transform the same into fertilizer or other by-products.

After sludge pit *b* has been emptied in the manner just described, I prefer to thoroughly wash the same by the use of water under pressure to insure that all of the perforations 7 in the plate 6 will be free from obstruction. When this has been done, the gate 6' may then again be opened and a new supply of sludge allowed to pass from pipe 5 into the sludge pit *b*.

It will be understood that the remaining sludge pits as *a* and *c* may in turn be emptied as required.

The particular advantage of the system here disclosed resides in the fact that all of the solid matter in the sludge will be collected in the different sludge pits inasmuch as the same cannot escape upwardly through the cover plate 6, in addition to the fact that the liquid in the sludge will be forced upwardly through the apertures 7 in the plate 6 under pressure so that the same will be aerated and will easily and thoroughly pick up the purifying chlorine so that the liquid which is finally allowed to escape will be inocuous and will not contaminate the things with which it may come in contact.

Under normal operation, the main sewer 1 is usually filled to a level of ½ to ⅔ of capacity, but under abnormal conditions, it may be filled to capacity. When the latter is the case, a portion of the sludge will pass over the gate 6' when the same is in the baffling position, but it will then impinge upon the inclined portion d of the plate 6 and will be deflected downwardly towards the bottom of sludge pit b, a certain amount of liquid being forced through the apertures in the inclined portion d of the plate 6.

It will be understood that the size, shape and number of sludge pits used may be varied to a considerable extent.

It will also be understood that the size, shape and location of the cover plate and the size and number of apertures therethrough may be varied, as may the material of which such cover plate is made, although I have found a plate of stainless steel polished on both sides is satisfactory for the purpose.

It also will be understood that the solid matter separated from the sludge in the sludge pits may be removed therefrom in other ways than by the use of the pump, although such an arrangement has been found to be satisfactory.

It will also be understood that the separator or filter used may be of different designs and in some cases the use of such separator or filter may be dispensed with.

It will also be understood that chlorine for the purification of the escaping liquid may or may not be used as desired.

Although I have shown a particular size and shape, number and arrangement of sludge pits together with a pumping and separating apparatus, I do not desire to restrict myself to the exact size, shape or arrangement of parts or to the use of any material in the construction of such parts, for although I have shown and described a specific structure and form and relation of parts as an exemplification of an embodiment of my invention, I do not desire to restrict myself to the exact size, shape or arrangement of parts, as various changes may be made within the scope of the appended claims.

I claim:

1. In a device of the class described, an imperforate tank having an open side and provided with an inlet at one end, a perforated cover plate for the open side of the tank, an adjustable baffle plate in said inlet adapted to deflect the incoming sludge downwardly beneath said cover plate and toward the bottom of the tank and means for operating said baffle plate.

2. In a device of the class described, an imperforate tank having an open side and provided with an inlet at one end, a perforated cover plate for the open side of the tank, a movable imperforate baffle plate mounted in said inlet adapted when in one position to deflect the incoming sludge downwardly beneath said cover plate and toward the bottom of the tank and when in another position to form a closure for said inlet, and means for operating said baffle plate.

3. In a device of the class described, an imperforate tank having an open side and provided with an inlet at one end, a perforated cover plate for the open side of the tank positioned in a plane intermediate the upper and lower edges of said inlet, and a baffle plate extending between the cover plate and the upper edge of said inlet adapted to deflect the incoming sludge downwardly beneath said cover plate and toward the bottom of the tank.

4. In a device of the class described, an imperforate tank having an open side and provided with an inlet at one end, a perforated cover plate for the open side of the tank positioned in a plane intermediate the upper and lower edges of said inlet, and a perforated baffle plate extending between the cover plate and the upper edge of said inlet adapted to deflect the incoming sludge downwardly beneath said cover plate and toward the bottom of the tank.

5. In a device of the class described, an imperforate tank having an open side and provided with an inlet at one end, a perforated cover plate for the open side of the tank positioned in a plane intermediate the upper and lower edges of said inlet and terminating in spaced relation to the inlet, and a baffle plate positioned between said cover plate and the inlet adapted to deflect the incoming sludge downwardly beneath said cover plate and towards the bottom of the tank.

6. In a device of the class described, an imperforate tank having an open side and provided with an inlet at one end, a perforated cover plate for the open side of the tank positioned in a horizontal plane intermediate the upper and lower edges of said inlet, and a perforated baffle plate secured to the tank to extend between the cover plate and the upper edge of said inlet adapted to deflect the incoming sludge downwardly beneath said cover plate and toward the bottom of the tank.

7. In a device of the class described, an imperforate tank having an open side and provided with an inlet at one end, the bottom of the tank being inclined downwardly from the inlet end of the tank toward the opposite end thereof, a perforated cover plate for the open side of the tank positioned in a horizontal plane intermediate the upper and lower edges of said inlet, and a perforated baffle plate secured to the tank to extend between the cover plate and the upper edge of said inlet adapted to deflect the incoming sludge downwardly beneath said cover plate and toward the bottom of the tank.

8. In a device of the class described, an imperforate tank having an open side and provided with an inlet at one end and an outlet at the opposite end, a perforated cover plate for the open side of the tank, and baffle means comprising a plurality of members associated with the tank and arranged in spaced relation adapted to deflect the incoming sludge downwardly beneath the cover plate and toward said outlet.

9. In a device of the class described, an imperforate tank having an open side and provided with an inlet at one end, a perforated cover plate for the open side of the tank, positioned in a plane intermediate the upper and lower edges of said inlet, the distance between the cover plate and bottom of the tank being greater at the closed end of the tank than at the inlet end thereof, and a baffle plate positioned between the cover plate and upper edge of the inlet adapted to deflect the incoming sludge beneath said cover plate.

10. A device of the class described comprising in combination a tank having a chamber therein open at one side and provided with an inlet, a perforated cover plate for the open side of said chamber, and a perforated baffle plate within the chamber associated with the perforated cover plate and inclined at an angle thereto for deflecting the solids of the incoming sludge downwardly away from said cover plate toward the bottom of the chamber and permitting the sludge liquor to flow along the surface of said cover plate.

11. A device of the class described comprising in combination a tank having a chamber therein open at the top and an inlet at one end, the bottom of said chamber being inclined downwardly from the inlet end toward the other end thereof, a horizontally disposed perforated cover plate for the open side of the chamber, and a perforated baffle plate within the chamber associated with the perforated cover plate and inclined at an angle thereto in the direction of the inclination of the bottom of the chamber for directing the solids of the incoming sludge downwardly away from the cover plate towards said inclined bottom and permitting the sludge liquor to flow along the surface of said cover plate.

MICHAEL J. MULLIN.